(12) United States Patent
Okabayashi et al.

(10) Patent No.: US 7,593,900 B2
(45) Date of Patent: Sep. 22, 2009

(54) HOST DEVICE, MEMORY CARD, MEMORY CAPACITY CHANGING METHOD, MEMORY CAPACITY CHANGING PROGRAM AND MEMORY CAPACITY CHARGE GIVING/RECEIVING METHOD

(75) Inventors: Hiroko Okabayashi, Sagamihara (JP); Tetsuya Kaise, Hino (JP); Akio Yazawa, Osato-gun (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 899 days.

(21) Appl. No.: 10/782,849

(22) Filed: Feb. 23, 2004

(65) Prior Publication Data

US 2005/0102232 A1  May 12, 2005

(30) Foreign Application Priority Data

Nov. 7, 2003  (JP) .......................... P2003-378572

(51) Int. Cl.
  *G06Q 40/00* (2006.01)
  *G06F 13/00* (2006.01)
  *G06F 13/28* (2006.01)

(52) U.S. Cl. .................... 705/41; 711/115; 711/163; 711/173

(58) Field of Classification Search ................ 711/115, 711/163, 173
  See application file for complete search history.

(56) References Cited

U.S. PATENT DOCUMENTS

| | | | | |
|---|---|---|---|---|
| 4,744,025 A | * | 5/1988 | Lipcon et al. ............... | 711/172 |
| 6,651,133 B2 | * | 11/2003 | Moore et al. ................ | 711/102 |
| 7,079,113 B1 | * | 7/2006 | Hayes et al. ................ | 345/158 |
| 7,143,237 B2 | * | 11/2006 | Suda .......................... | 711/115 |
| 2002/0120826 A1 | * | 8/2002 | Venkatraman et al. ...... | 711/207 |
| 2003/0183698 A1 | * | 10/2003 | Wu ............................. | 235/492 |
| 2004/0204093 A1 | * | 10/2004 | Imaeda ...................... | 455/558 |
| 2004/0250009 A1 | * | 12/2004 | Chen et al. .................. | 711/103 |
| 2006/0156036 A1 | * | 7/2006 | Oh et al. ..................... | 713/193 |
| 2008/0168152 A1 | * | 7/2008 | Weizman .................... | 709/213 |

FOREIGN PATENT DOCUMENTS

| | | |
|---|---|---|
| CN | 1453709 A | 11/2003 |
| FR | 2695751 A1 * | 3/1994 |
| JP | 57079567 A * | 5/1982 |
| JP | 2001-60286 | 3/2001 |
| JP | 2002-109631 | 4/2002 |
| JP | 2003-140968 | 5/2003 |
| JP | 2003-324379 | 11/2003 |

* cited by examiner

Primary Examiner—Daniel S Felten
Assistant Examiner—William E Rankins
(74) Attorney, Agent, or Firm—Oblon, Spivak, McClelland, Maier & Neustadt, P.C.

(57) ABSTRACT

A host device exchanging information with a memory card, the host device including: a charge management module configured to receive payment of a charge corresponding to an increased amount of a usable area if a capacity of the usable area of the memory card for saving user data is increased, and pay out a charge corresponding to the reduced amount of the usable area if the capacity of the usable area is reduced; and a transmission module configured to transmit an area changing command to instruct an increase or a reduction of the usable area in accordance with the charge to the memory card.

10 Claims, 16 Drawing Sheets

FIG. 6

| CURRENT CAPACITY: 64MB<br>MAXIMUM CAPACITY: 512MB | | | |
|---|---|---|---|
| ADDED MEMORY CAPACITY | TOTAL CAPACITY | AMOUNT | |
| 32MB | 96MB | 1000 YEN | PURCHASE |
| 64MB | 128MB | 2000 YEN | PURCHASE |
| 128MB | 192MB | 4000 YEN | PURCHASE |
| 256MB | 384MB | 8000 YEN | PURCHASE |
| 512MB | - | - | PURCHASE |

| CURRENT CAPACITY: 128MB |
| MAXIMUM CAPACITY: 512MB |

| REDUCED MEMORY CAPACITY | MEMORY CAPACITY | AMOUNT | |
| --- | --- | --- | --- |
| 32MB | 96MB | 500 YEN | REFUND |
| 64MB | 64MB | 5000 YEN | REFUND |
| 128MB | 0MB | 2000 YEN | REFUND |
| 256MB | - | - | REFUND |
| 512MB | - | - | REFUND |

105

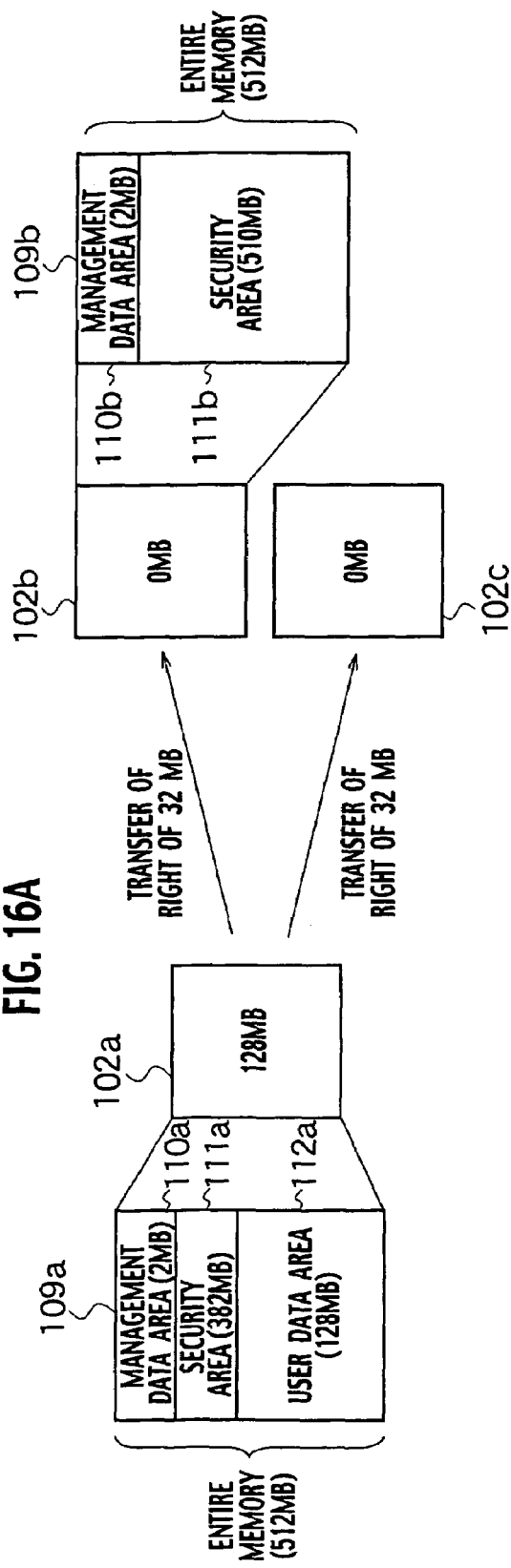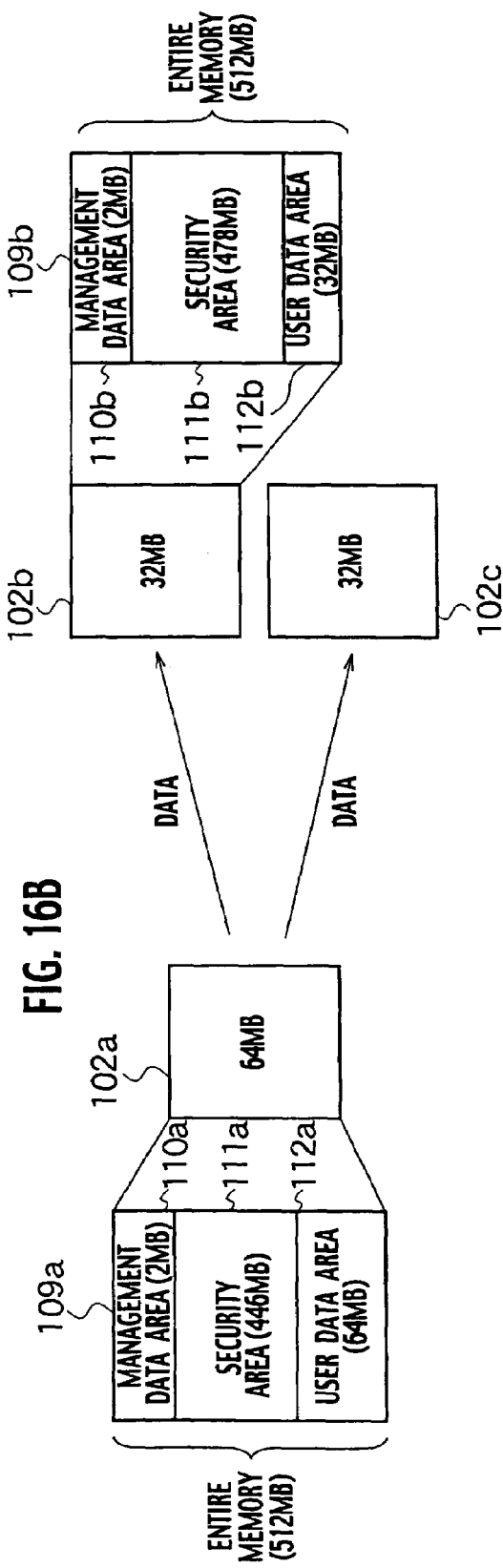

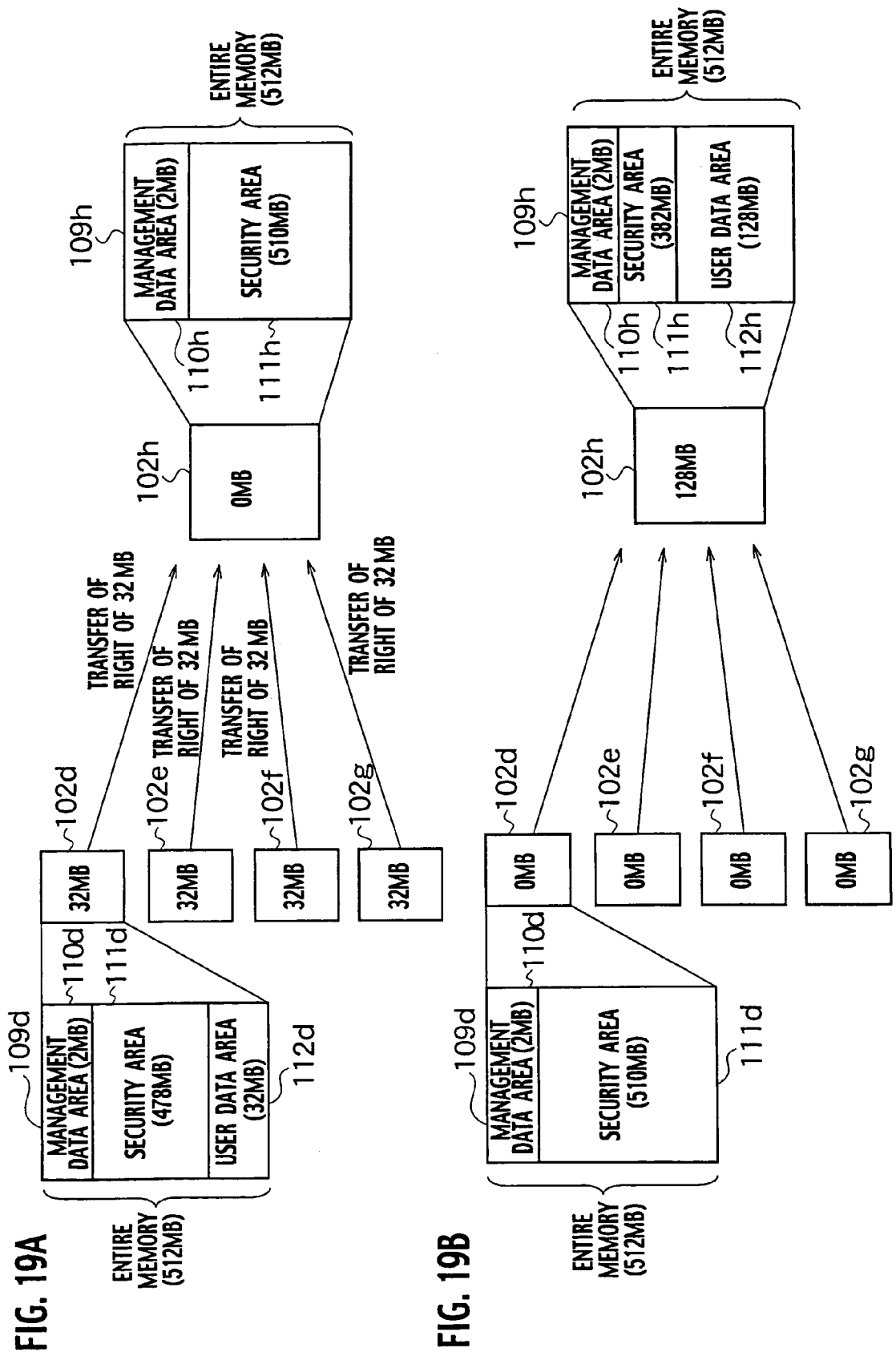

HOST DEVICE, MEMORY CARD, MEMORY CAPACITY CHANGING METHOD, MEMORY CAPACITY CHANGING PROGRAM AND MEMORY CAPACITY CHARGE GIVING/RECEIVING METHOD

CROSS REFERENCE TO RELATED APPLICATIONS

This application is based upon and claims the benefit of priority from prior Japanese Patent Application P2003-378572 filed on Nov. 7, 2003; the entire contents of which are incorporated by reference herein.

BACKGROUND OF THE INVENTION

1. Field of the Invention

The present invention relates to a host device which can change a capacity of a memory area, a memory card, a memory capacity changing method, a memory capacity changing program and a memory capacity charge giving/receiving method.

2. Description of the Related Art

Magneto-optical disks such as a CD and a DVD have gained great popularity in recent years. Among such magneto-optical disks, a CD-R and a DVD-R have been widely used as storage devices to record digital data.

For settlement of charges regarding such storage devices, a technology has been disclosed to simplify the settlement of charges by using a prepaid card printed in a self-printing manner (Japanese Patent Application Laid-open No. 2002-109631). A technology has also been disclosed to pay charges for downloading software contents in advance by a prepaid card (Japanese Patent Application Laid-open No. 2001-60286).

Conventionally, when a user buys a CD-R or a DVD-R, the user pays a certain amount of money for one disk regardless of a capacity to be used. For example, in the case of a CD-R capable of saving data of 650 megabytes (abbreviated to MB hereinafter), remaining 550 MB are left unused when data of 100 MB is saved. However, as the user pays for one disk, there is a problem that the user must pay the same amount of money whether data of 650 MB is saved in the CD-R or only data of 100 MB is saved.

There is a similar problem in a semiconductor memory card (abbreviated to "memory card", hereinafter). As a memory capacity is increased, charges must be paid even for an unused memory area. For example, in the case of a memory card of 512 MB, even if only 128 MB are normally used while remaining 384 MB are unused the user pays for 512 MB to buy the memory card.

Meanwhile, a product adaptable to a memory card such as a digital still camera is equipped with a memory card which is most often small in capacity, e.g., 8 MB or 16 MB, because of costs. In this case, if the amount of data saved in the memory card is increased, the user is required to carry a plurality of small-capacity memory cards. To avoid the trouble of doing so, a frequency of usage of the small-capacity memory cards is reduced, and the memory cards are made disposable, creating a serious environmental problem.

SUMMARY OF THE INVENTION

A first aspect of the present invention is to provide a host device exchanging information with a memory card, the host device comprising: a) a charge management module configured to receive payment of a charge corresponding to an increased amount of a usable area if a capacity of the usable area of the memory card for saving user data is increased, and pay out a charge corresponding to the reduced amount of the usable area if the capacity of the usable area is reduced; and b) a transmission module configured to transmit an area changing command to instruct an increase or a reduction of the usable area in accordance with the charge to the memory card.

A second aspect of the present invention is to provide a memory card comprising: a) a usable area for saving a user data; and b) a controller for changing a capacity of the usable area in accordance with an area changing command to instruct an increase or a reduction of the usable area based on a charge, the command being transmitted from a host device which receives payment of a charge corresponding to an increased amount of the usable area if the usable area is increased, and pays out a charge corresponding to a reduction of the usable area if the usable area is reduced.

A third aspect of the present invention is to provide a method for changing a storage capacity of a memory card, comprising: if a capacity of a usable area of the memory card for saving a user data is increased, a) receiving payment of a charge corresponding to an increased amount of the usable area by a host device which can access the memory card; b) transmitting an area changing command to instruct an increase of the capacity of the usable area in accordance with the charge to the memory card from the host device; and c) increasing the capacity of the usable area of the memory card in accordance with the area changing command, and if the capacity of the usable area is reduced, d) transmitting an area changing command to instruct a reduction of the capacity of the usable area to the memory card from the host device; e) reducing the capacity of the usable area of the memory card in accordance with the area changing command; and f) refunding a charge corresponding to the reduction of the usable area by the host device.

A forth aspect of the present invention is to provide a method for changing a usable area capacity for saving a user data of a memory card, comprising: a) transmitting an area changing command to instruct a reduction of the usable area of one or more of a plurality of memory cards from a host device which can access the memory card; b) reducing the usable area of the one or more of the memory cards in accordance with the area changing command; c) transmitting an area changing command to increase the usable area by an amount equivalent to the reduction of the other one of the plurality of memory cards from the host device; and d) increasing the usable area of another memory card in accordance with the area changing command.

A fifth aspect of the present invention is to provide a storage capacity changing computer program product to be executed by a host device, the host device exchanging information with a memory card, the computer program product comprising: a) instructions configured to receive payment of a charge corresponding to an increased amount of a usable area if a capacity of the usable area of the memory card for saving a user data is increased, and pay out a charge corresponding to a reduction of the usable area if the capacity of the usable area is reduced; and b) instructions configured to transmit an area changing command to instruct an increase or a reduction of the usable area in accordance with the charge to the memory card.

A sixth aspect of the present invention is to provide a storage capacity changing computer program product to be executed by a memory card, the memory card having a usable area for saving a user data and a controller changing the usable area capacity, the computer program product comprising: a) instructions configured to change the capacity of the usable area following an area changing command instructing an increase or a reduction of the usable area in accordance with a charge, the command transmitted from a host device which receives payment of a charge corresponding to an increased amount of the usable area if the usable area is increased and pays out a charge corresponding to a reduced amount of the usable area if the usable area is reduced.

A seventh aspect of the present invention is to provide a method for paying and receiving a charge for a storage capacity of a memory card, the method using in a storage capacity changing system including a host device changing information with a memory card with a usable area for saving a user data and changing the usable area capacity according to a charge, the method comprising: if a capacity of the usable area is increased, a) paying of a charge corresponding to an increased amount of the usable area by a user of the memory card to the host device; b) collecting of the charge by a dealer who sells the memory card; c) paying of a part of the charge collected by the dealer who sells the memory card to a manufacturer which manufactures the memory card; and if the capacity of the usable area is reduced, d) paying out a charge corresponding to a reduction of the usable area by the dealer who sells the memory card through the host device to the user.

BRIEF DESCRIPTION OF THE DRAWINGS

FIG. 6 is a view showing an operation screen example when a memory increase button is depressed in FIG. 5.

FIG. 8 is a view showing an operation screen example when a memory reduction button is depressed in FIG. 5.

FIGS. 16A and 16B are schematic views (1) when a memory capacity of a memory card according to the second embodiment is changed.

FIGS. 19A and 19B are schematic views (2) when the memory capacity of the memory card according to the second embodiment is changed.

DETAILED DESCRIPTION OF THE INVENTION

Figure 1:
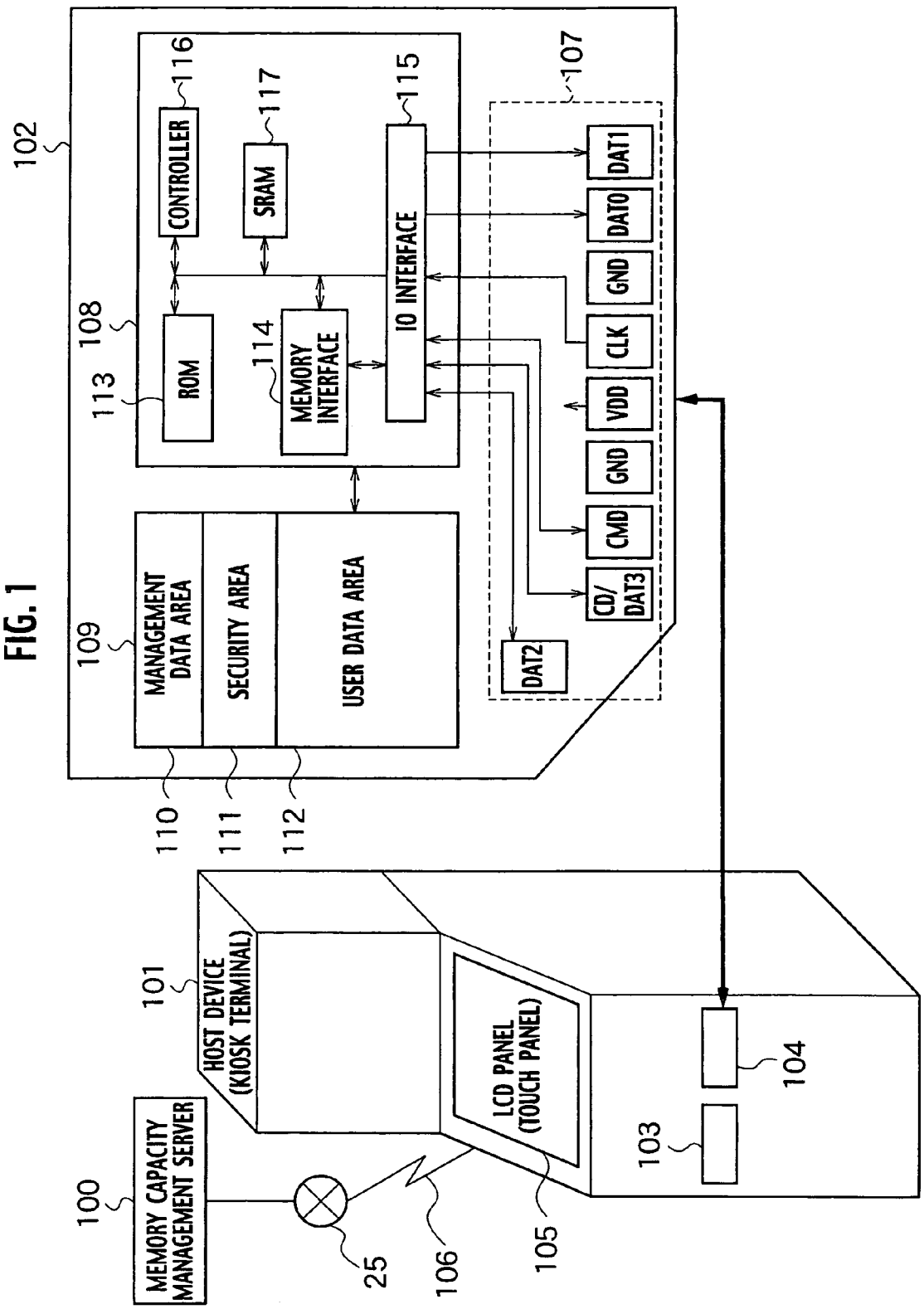
FIG. 1 is a block diagram showing a configuration of a memory capacity changing system according to a first embodiment.

Various embodiments of the present invention will be described with reference to the accompanying drawings. It is to be noted that the same or similar reference numerals are applied to the same or similar parts and elements throughout the drawings, and the description of the same or similar parts and elements will be omitted or simplified.

First Embodiment

Description will be made of a memory capacity changing system of a first embodiment in which a capacity of a normally usable memory area of a memory card is changed by a specific host device and the amount of money corresponding to an increased capacity is paid by a user, or the amount of money corresponding to a reduced capacity is refunded by the host device. In the description below, a "usable area" means an area which can be used to save image data, music data or the like (e.g., user data area shown in FIG. 1), and a "usable capacity" means a capacity of the usable area. "User data" means a data such as image data or music data which are saved by the user.

(Configuration of Memory Capacity Changing System, Host Device and Memory Card)

As shown in FIG. 1, the memory capacity changing system according to the first embodiment includes a host device (KIOSK terminal) 101, a memory card 102, and a memory capacity management server 100.

The host device 101 includes a money deposit/withdrawal port 103 for depositing and withdrawing money, a memory card insertion port 104 through which a plurality of memory cards 102 can be inserted, an LCD panel 105 corresponding to a touch panel for prompting the user to perform an operation, and a communication interface 106 for connection to the Internet. As the host device 101, a digital device such as a personal computer, or a KIOSK terminal can be used.

Figure 2:
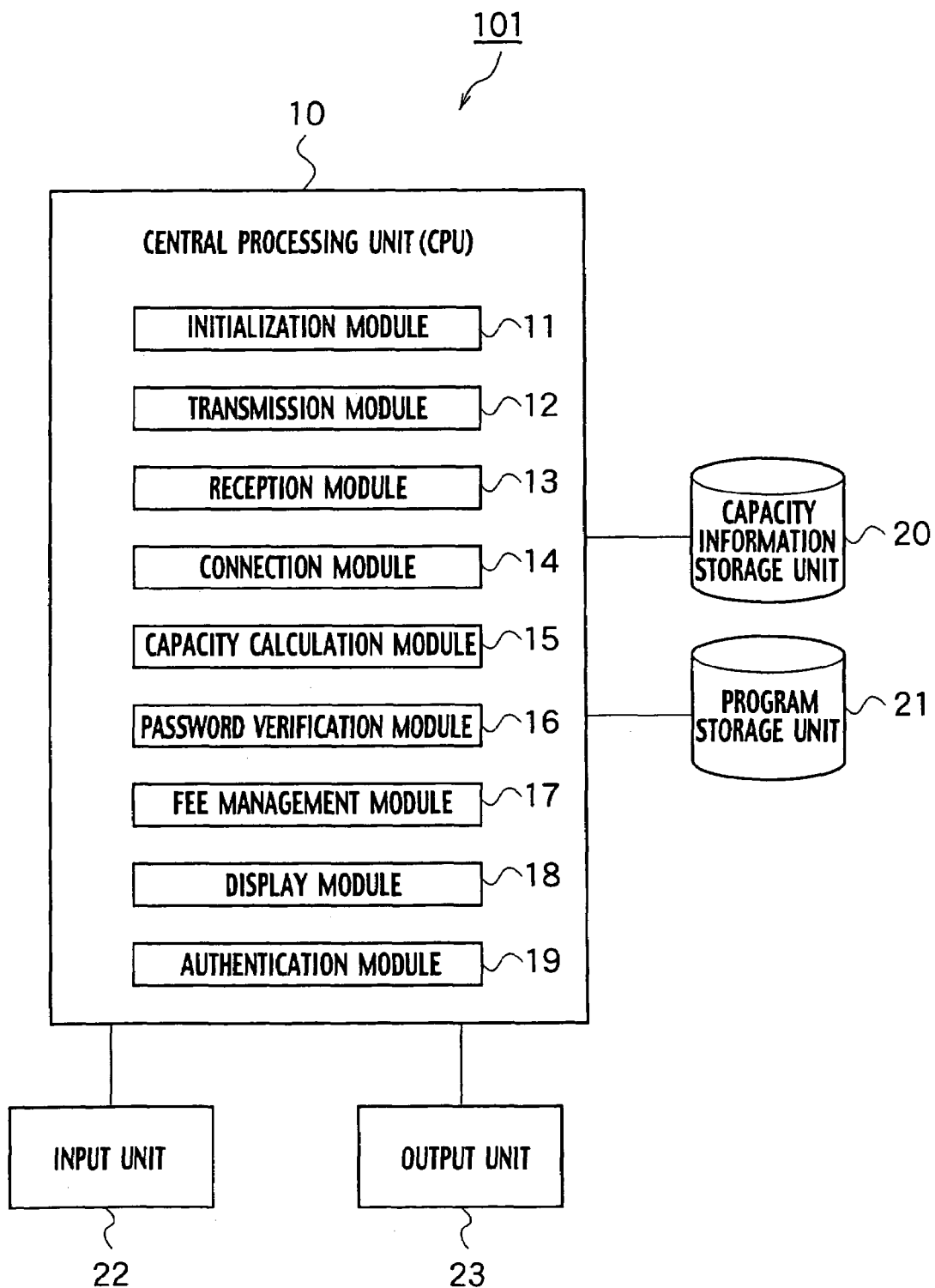
FIG. 2 is a block diagram showing a configuration of a host device according to the first embodiment.

As shown in FIG. 2, the host device 101 can include a central processing unit (CPU) 10 in which an initialization module 11, a transmission module 12, a reception module 13, a connection module 14, a capacity calculation module 15, a password verification module 16, a charge management module 17, a display module 18, and an authentication module 19 are incorporated. These modules can be realized by executing a dedicated program for using a predetermined program language in a general-purpose computer such as a personal computer. A capacity information storage unit 20, a program storage unit 21, an input unit 22, and an output unit 23 are connected to the CPU 10.

The initialization module 11 executes initialization processing to set the memory card 102 in a readable/writable state.

The transmission module 12 transmits an area confirmation command for confirming a usable capacity to the memory card 102. In the case of using a Secure Digital (SD) memory card as the memory card 102, in order to confirm a capacity of a user area 112 of the memory card 102, the area confirmation command reads a register (CSD register) in which a value for calculating the capacity of the user data area 112 is stored. The transmission module 12 transmits an area changing command for changing the usable capacity to the memory card 102. The area changing command contains the changed usable capacity information.

The reception module 13 receives usable capacity information of the memory card 102 which is transmitted from the memory card 102 in response to the area confirmation command transmitted from the transmission module 12. In the case of using the SD memory card as the memory card 102, the reception module 13 receives a register value stored in a management data area 110. Moreover, the reception module 13 receives a response transmitted from the memory card 102 in response to the area changing command transmitted from the transmission module 12.

The connection module 14 connects with the memory capacity management server 100 through a communication network (the Internet) 25. The connection module 14 obtains data on the amount of money corresponding to an increase or a reduction of the usable capacity from the memory capacity management server 100, and saves the data in the capacity information storage unit 20. Moreover, the connection module 14 notifies a changed amount to the memory capacity management server 100 when the usable capacity is increased or reduced.

The capacity calculation module 15 calculates a current usable capacity of the memory card 102 based on the usable capacity information received from the memory card 102. In the case of using the SD memory card as the memory card 102, the capacity is calculated based on the received register value. However, if the memory card 102 manages a memory capacity, the memory card 102 may include a function equivalent to the capacity calculation module 15. For example, when the host device 101 sends an area changing command for increasing a usable capacity to the memory card 102 and the memory card 102 receives the command, the memory card 102 judges a possibility/impossibility of an increase to increase the memory capacity.

The password verification module 16 verifies a capacity changing password inputted by the user when the memory capacity is increased or reduced. If the capacity changing password is correct, the password verification module 16 notifies this to the transmission module 12 to change the usable capacity of the memory card.

The charge management module 17 calculates a charge for an increase or a reduction of the memory capacity based on the money amount data saved in the capacity information storage unit 20. The charge management module 17 receives a charge corresponding to an increased amount of the usable area when the usable area is increased, and pays a charge corresponding to a reduced usable area when the usable area is reduced.

Figure 5:
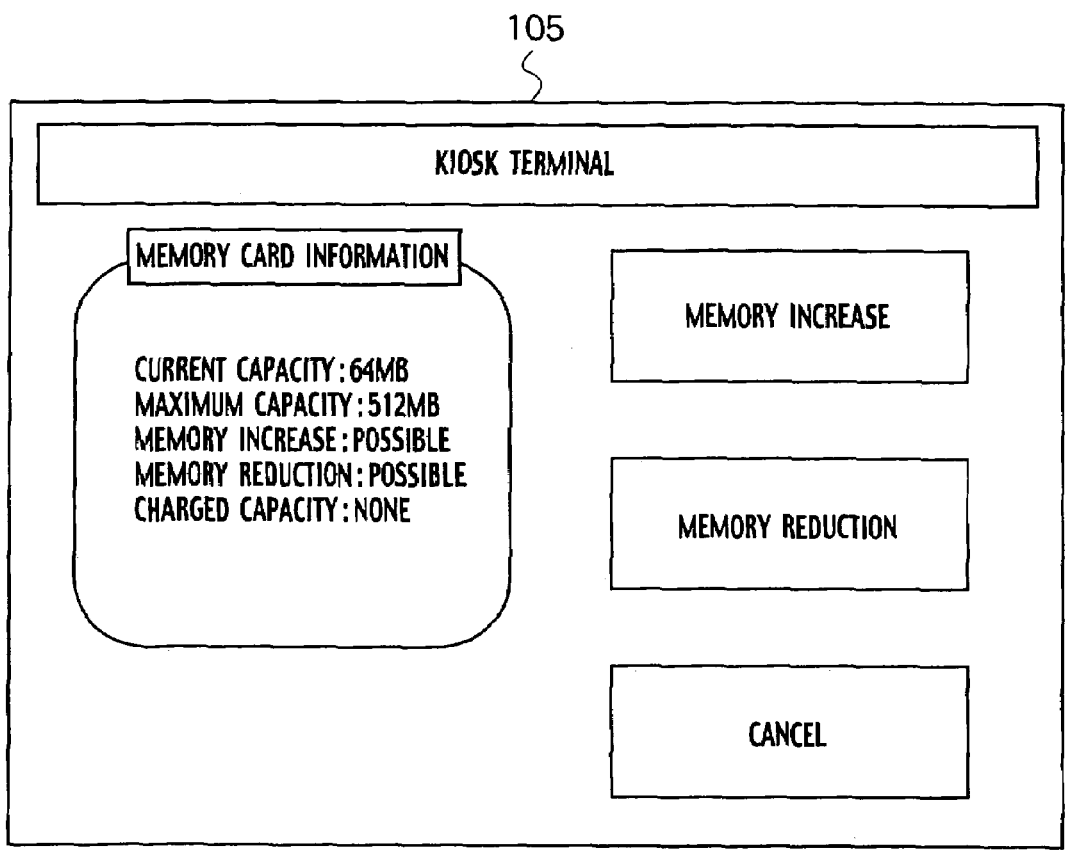
FIG. 5 is a view showing an operation screen example of the host device according to the first embodiment.

The display module 18 displays an operation screen shown in FIG. 5 or money amount data shown in FIGS. 6 and 8 on the output unit 23.

The authentication module 19 executes two-way authentication with the memory card 102 when a security area 111 of the memory card 102 is accessed.

The capacity information storage unit 20 saves data on the amount of money corresponding to an increase or a reduction of the memory capacity. As described above, the money amount data may be obtained from the memory capacity management server 100, saved beforehand in the host device 101 by the input unit 22 or the like. The capacity information storage unit 20 may use an internal storage device such as a RAM, or an external storage device such as a hard disk or a flexible disk.

The input unit 22 means a device such as a touch panel 105 (see FIG. 1), a keyboard, a mouse or the like. Upon input operation from the input unit 22, corresponding key information is transmitted to the CPU 10. An output unit 27 means a screen such as a touch panel 105 (see FIG. 1) or a monitor, and a liquid crystal display (LCD), a light emitting diode (LED) panel, an electroluminescence (EL) panel or the like can be used therefor.

The program storage unit 21 is a storage medium for saving a program which causes the CPU 10 to calculate the memory capacity, a charge corresponding to the memory capacity, and the like. As the storage medium, for example, a RAM, a hard disk, a flexible disk, a compact disk, an IC chip, a cassette tape and the like, are available. According to the storage medium saving such a program, saving, transporting and selling of the program can be easily executed.

On the other hand, as shown in FIG. 1, the memory card 102 includes an interface signal terminal 107 for exchanging information with the host device 101, a processor module 108, and a NAND memory 109. Hereinafter, a configuration of the memory card 102 will be exemplified by the SD memory card. Specifically, the SD memory card has a size of 24×32×2.1 mm and a copyright protection function compliant with the SDMI standard, and provides upper compatibility of multi media cards (MMC). The SD memory card is a memory card of the SDMI standard jointly developed by three companies: Toshiba Corporation, Matsushita Electric Industrial Co., Ltd., and SanDisk Corporation.

The interface signal terminal 107 is constituted of nine signal terminals which include a clock terminal CLK, a terminal CMD for transferring a command and a response in response to the command, data terminals DAT0 to DAT3, a power supply terminal VDD, and a ground terminal GND.

The NAND memory 109 is mainly divided into a management data area 110 for storing information regarding the memory card, a security area 111 for storing secret data, and a user data area 112 for storing general data. The management data area 110 stores card information such as security information of the memory card 102 or media ID, and is an area which cannot be used by the user. The security area 111 is an area for executing two-way authentication with the connected host device 101, is an area to be accessible only when the host device 101 is authenticated, and is difficult to be freely used by the user. The user data area 112 is an area freely used by the user who uses the memory card 102 and is an area for storing general data such as image data and/or music data. The NAND memory 109 may have a hidden area. The hidden area cannot be accessed from the outside, and stores important data such as security information or an encryption key.

The processor module 108 includes a controller 116, which is a main control unit of the memory card 102, a ROM 113 storing a control program, an SRAM 117 used as a work buffer memory, and an IO interface 114 connected to the interface signal terminal 107 to serve as an interface between the memory card 102 and the host device 101.

Figure 4:
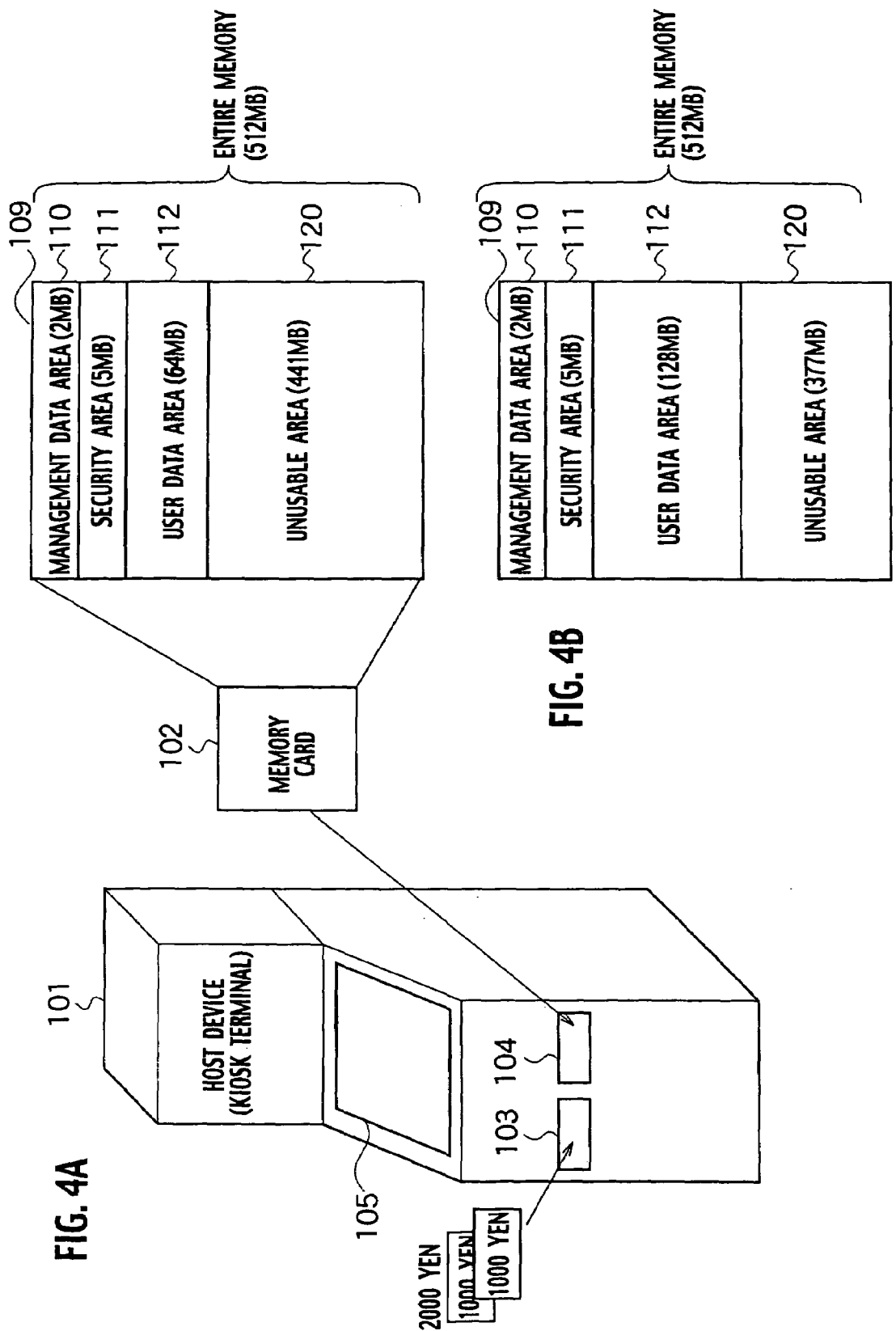
FIGS. 4A and 4B are schematic views when a memory capacity is changed in a memory card according to the first embodiment.

The memory card 102 of the first embodiment changes a usable capacity thereof by changing a capacity of the user data area 112. As shown in FIGS. 4A and 4B, the NAND memory 109 of the memory card 102 of the first embodiment includes an unusable area 120 in addition to the management data area 110, the security area 111, and the user data area 112. According to the first embodiment, the capacities of the user data area 112 and the unusable area 120 are changed in order to change the usable capacity. Specifically, the controller 116 changes a capacity value of the user data area 112 stored in the management data area 110 or in the hidden area to enable switching between the user data area 112 and the unusable area 120.

The memory capacity management server 100 shown in FIG. 1 provides data on the amount of money payable corresponding to an increased or a reduced usable capacity of the host device 101 through the Internet 25. Moreover, the memory capacity management server 100 obtains change information from the host device 101 when the usable capacity of the memory card 102 is increased or reduced, and manages the data. The manufacturer of the memory card can access the memory capacity management server 100 to know a currently usable capacity of the sold memory card.

According to the host device and the memory card of the first embodiment, the capacity of the memory area can be changed in accordance with the amount of money. The user pays a charge for a used capacity, and thus the memory card can be effectively used.

(Method for Changing Memory Capacity)

Next, description will be made of a memory capacity changing method according to the first embodiment, when the capacity of the memory card 102 is increased, referring to FIGS. 3 to 6. In the description below, the SD memory card is used as the memory card 102.

The user has a digital still camera, and a memory card 102 having a total memory capacity 512 MB (capacity of a user data area 112), of which 64 MB is a usable capacity, as shown in FIG. 4A. For example, when the user goes on a trip, the memory card usable capacity is increased from 64 MB to 128 MB because of a possibility that a memory capacity shortage may occur while traveling if the memory capacity is maintained at 64 MB.

(a) First, the user visits a store in which the host device 101 is installed, and inserts the memory card 102 into the memory card insertion port 104 of the host device 101 in step S101. In this event, if the memory card 102 is inserted into the memory card insertion port 104 in a power-on state of the host device 101, or if power is turned on for the host device 101 in a mounted state of the memory card 102, in step S102, the memory card 102 is set in a power-on state, and the host device 101 carries out an initialization processing to set the memory card 102 in a readable/writable state.

(b) Subsequently, in step S103, in order to verify a capacity of the user data area 112 of the memory card 102, the host device 101 transmits a command to read out a register which stores a value for calculating the capacity of the user data area 112. The memory card 102 receives the command in step S104, and transmits a register value stored in the management data area 110 to the host device 101 in step S105.

(c) In step S106, the host device 101 receives the register value from the memory card 102. In step S107, the host device 101 calculates a total memory capacity (maximum capacity) of the memory card 102 and a current capacity of the user data area 112. Then, as shown in FIG. 5, the host device 101 displays the current capacity (64 MB) of the user data area 112, the maximum capacity (512 MB), a capability of a memory increase, a capability of a memory reduction, and a charged capacity on the LCD panel 105. The charged capacity will be described in detail later. Moreover, in this event, the host device 101 accesses the memory capacity management server through the Internet 25 and obtains data on the amount of money corresponding to an increase or a reduction of the memory capacity and saves the data in the capacity information storage unit 20.

(d) Then, in step S108, the user refers to the LCD panel 105 to verify the current capacity (64 MB) of the user data area 112, the maximum capacity (512 MB), the capability of the memory increase, the capability of the memory reduction, and the charged capacity. Then, in step S109, the user depresses a "MEMORY INCREASE", "MEMORY REDUCTION" or "CANCEL" button. The "CANCEL" button is for finishing the processing. Here, the user selects the "MEMORY INCREASE". Then, as shown in FIG. 6, the host device 101 displays an added memory capacity, a total capacity and the amount of money on the LCD panel 105. The user checks the amounts of money charged for added memory capacities and depresses a "PURCHASE" button corresponding to a desired memory capacity. It is assumed here that the user buys an additional memory of 64 MB.

(e) The host device 101 causes a password input screen to be displayed on the LCD panel 105 (not shown), so that the user inputs a capacity changing password in step S110. In step S111, the host device 101 verifies the password. The password to be inputted may be a preregistered password, a value set intrinsically to a card by the memory card manufacturer, a serial number, a telephone number, a mail address or the like. It is assumed here that the password to be verified is a password previously registered by the user upon purchase of the memory card or the first usage, and stored in the memory card. The password can be changed in the process of using the card. Moreover, the input of the password may be unnecessary, for changing the capacity. Upon verification of the password, in step S112, the host device 101 displays a message indicating a deposit of a charge for an increase, 2000 yen, on the LCD panel 105 or the like to prompt the user to deposit the money. Then, in step S113, the user checks the charge and in step S114, the user deposits 2000 yen, which is a purchase price of 64 MB, to the money deposit/withdrawal port 103 of the host device 101 (see FIG. 4A).

(f) In step S115, the host device 101 confirms the deposit of the changed amount of money (2000 yen) for the added memory capacity, and notifies execution of a memory increase to the memory card capacity management server 100 through the Internet 25. Then, the host device 101 transmits a user data area changing command to the memory card 102.

(g) Subsequently, in step S116, the memory card 102 receives the user data area changing command. The memory card 102 changes the capacity of the user data area 112. Specifically, the controller 116 of the memory card 102 changes the capacity value of the user data area 112 stored in the management data area 110 or in the hidden area to change the user data area 112 from 64 MB shown in FIG. 4A to 128 MB shown in FIG. 4B. Simultaneously, the unusable area 120 is reduced from 441 MB to 377 MB. Then, in step S117, the memory card 102 transmits a response to the host device 101.

(h) Then, in step S118, the host device 101 receives the response from the memory card 102, and displays the changed capacity of the user data area on the LCD display panel 105 in step S119 (not shown). In step S120, the user checks the LCD panel 105 to confirm the completion of the capacity change.

Next, description will be made of the memory capacity changing method according to the first embodiment when the capacity of the memory card 102 is reduced, referring to FIGS. 7 and 8. The description will be made by exemplifying a case in which a memory capacity of user's memory card of 128 MB is reduced to 64 MB.

Figure 3:
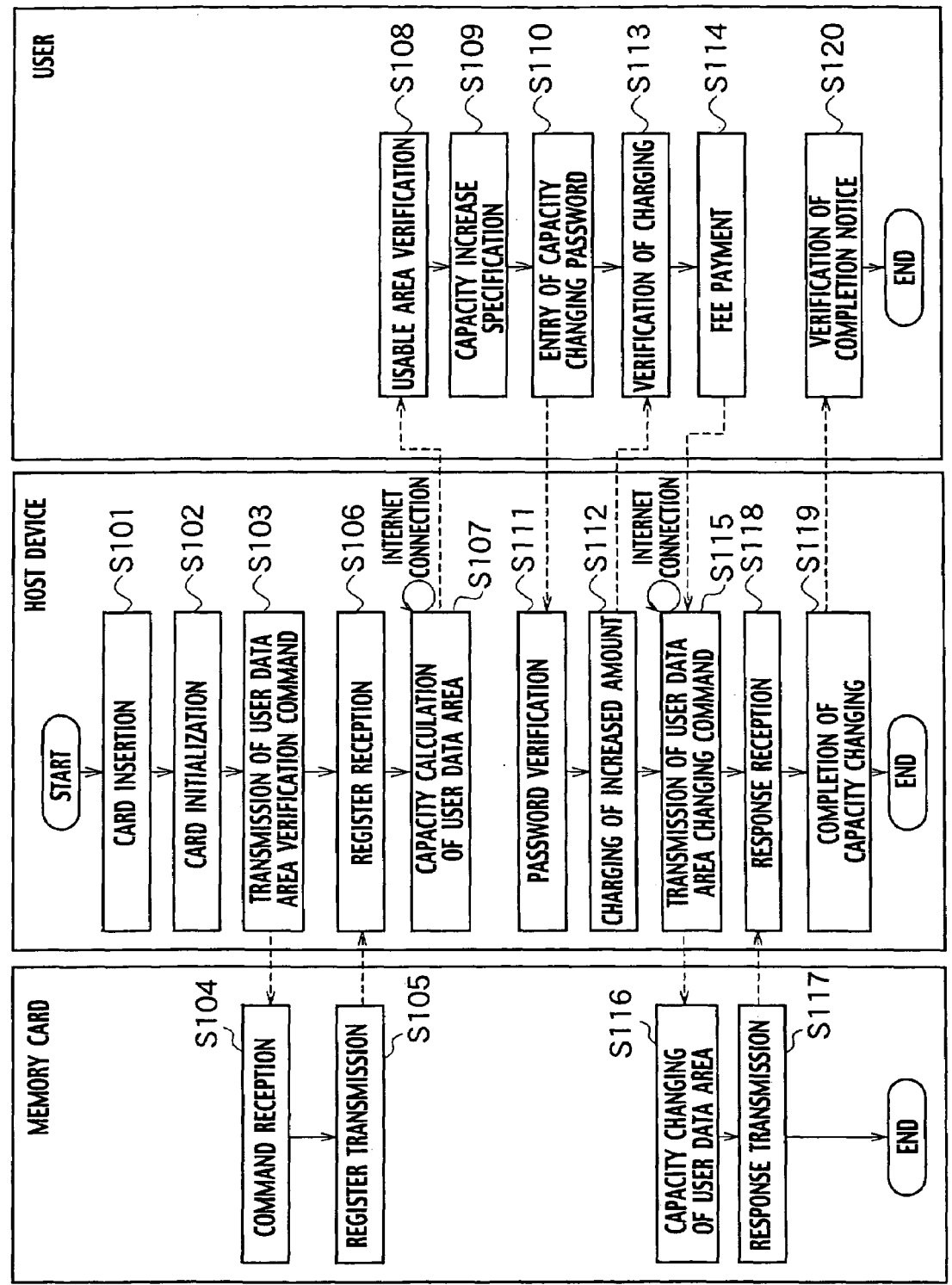
FIG. 3 is a flowchart when a memory capacity is increased in a memory capacity changing method according to the first embodiment.

(a) Processing of steps S201 to S208 is similar to that of steps S101 to S108 of FIG. 3, and thus description thereof will be omitted. In step S209, the user depresses a "MEMORY REDUCTION" button shown in FIG. 5. Then, as shown in FIG. 8, the host device 101 causes a reduced memory capacity, a memory capacity and an amount of money payable to be displayed on the LCD panel 105. The user checks the amounts of money for desired reduced memory capacities and depresses a "REFUND" button corresponding to a memory capacity to be reduced. It is assumed here that the amount of money for a memory capacity of 64 MB is refunded to the user. Note that according to the first embodiment, a charge of the memory reduction is set to a half of the charge of the memory increase.

(b) Then, the host device 101 displays a password input screen on the LCD panel 105, whereby the user inputs a capacity changing password in step S210 similarly to the case of step S110 of FIG. 3. In step S211, the host device 101 verifies the password. Upon verification of the password, in step S212, the host device 101 notifies execution of a memory reduction to the memory card capacity management server 100 through the Internet. Then, the host device 101 transmits a user data area changing command to the memory card 102.

(c) In step S213, the memory card 102 receives the user data area changing command. The memory card 102 subsequently changes the capacity of the user data area 112. Specifically, the controller 116 of the memory card 102 changes the capacity value of the user data area 112 stored in the management data area 110 or in the hidden area to change the user data area 112 from 128 MB shown in FIG. 4B to 64 MB shown in FIG. 4A. Simultaneously, the unusable area 120 is increased from 377 MB to 441 MB. Then, in step S214, the memory card 102 transmits a response to the host device 101.

(d) In step S215, the host device 101 receives the response from the memory card 102, and in step S216 the host device 101 causes the changed capacity of the user data area to be displayed on the LCD display panel 105 (not shown). Then, in step S217, the user checks the LCD panel 105 to confirm the completion of the capacity change.

(e) In step S218, the host device 101 pays out 1000 yen for the reduced memory capacity 64 MB to the money deposit/withdrawal port 103. In step S219, the user receives the money.

Next, description will be made of a method for temporarily saving data which exceeds the usable capacity in the unusable area 120.

Figure 9:
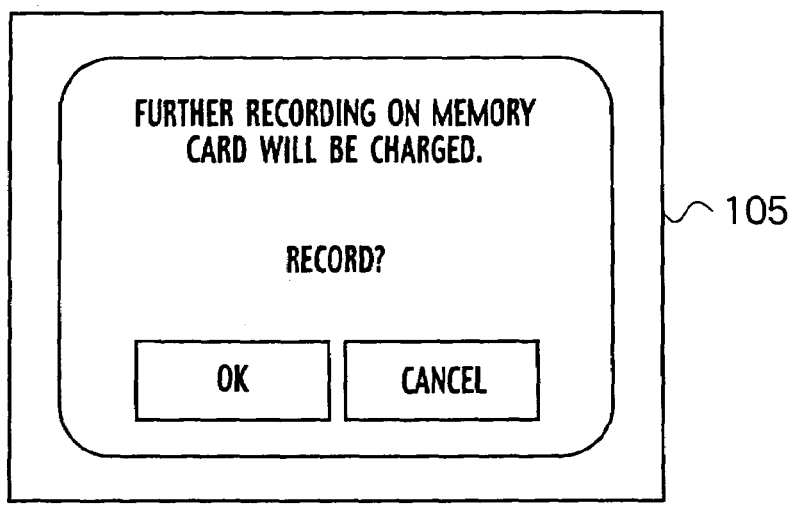
FIG. 9 is a view showing a screen example (1) of the host device displayed when data exceeding the memory capacity is recorded on the memory card.

For example, when the user saves photos taken by the digital still camera in the memory card 102 while traveling, the capacity of the memory card 102 may occasionally run short. In such a case, data of up to 10% of the user data area 112 may be allowed to be saved in the unusable area. In such a case, a screen similar to that of FIG. 9 is displayed on the digital still camera. If the user selects "OK", the digital still camera saves the data in the unusable area. However, if "CANCEL" is selected, the data is not saved. If there is data saved in the unusable area, the charged capacity of the memory card information of FIG. 5 is displayed to be "PRESENT" when the memory card 102 is inserted into the host device. Then, the user pays a charge for the increase of the usable area, whereby the added memory use is changed from the unusable area 120 to the user data area 112.

Figure 10:
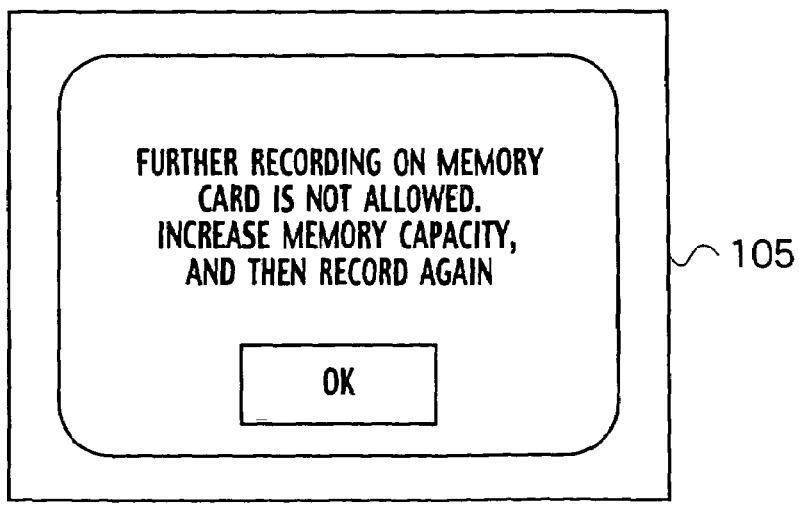
FIG. 10 is a view showing a screen example (2) of the host device displayed when data exceeding the memory capacity is recorded on the memory card.

Moreover, if recording is carried out in excess of 10% of the usable area, a screen similar to that of FIG. 10 is displayed because further recording is not allowed.

Thus, the unusable area of 10% of the user data area 112 may be allowed to be used. However, if the unusable area is used, when the memory card 102 is inserted into the host device 101 or the host device 101 such as a personal computer, the unusable area becomes a user data area, and it is charged for. In the description, 10% of the unusable area of the user data area 112 can be used. However, the entire unusable area may be allowed to be used.

Furthermore, the data saved in the unusable area may be banned from being read out until a charge of the used capacity is paid, or automatically erased after a passage of a fixed period.

According to the memory capacity changing method of the first embodiment, the capacity of the user data area 112 of the memory card 102 can be changed in accordance with user's purpose, and the user is only charged for a used memory capacity.

(Memory Capacity Charge Paying and Receiving Method)

Figure 14:
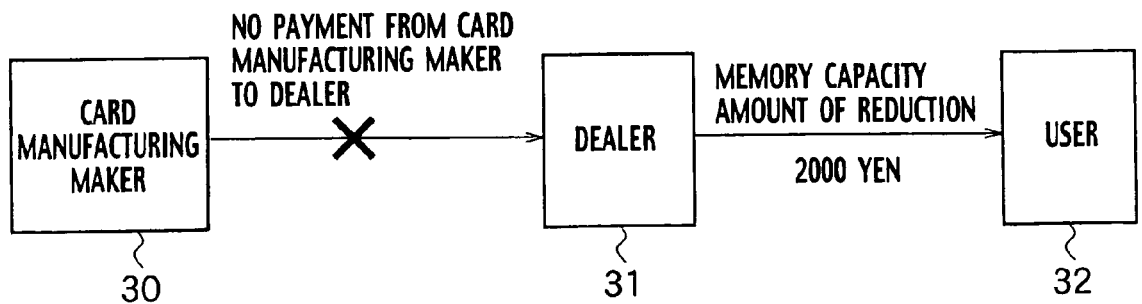
FIG. 14 is a schematic view when the memory capacity is reduced in the memory capacity charge giving/receiving method according to the first embodiment.

Next, description will be made of a memory capacity charge paying and receiving method when the usable capacity of the memory card is increased or reduced in the memory capacity changing system of the first embodiment. A flow of a charge when the usable capacity is increased will be described referring to FIGS. 11 and 12. In FIGS. 12 and 14 (described later), a dealer 31 indicates a retail store which sells memory cards, and manages the host device 101.

Figure 11:
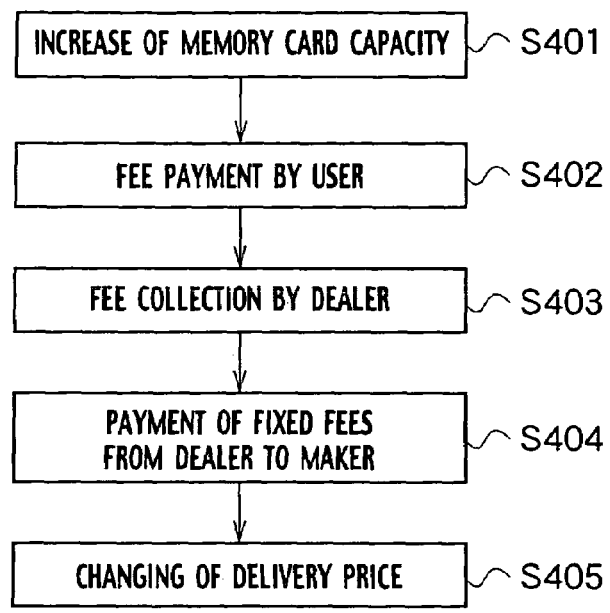
FIG. 11 is a flowchart when the memory capacity is increased in a memory capacity charge giving/receiving method of the first embodiment.
Figure 12:
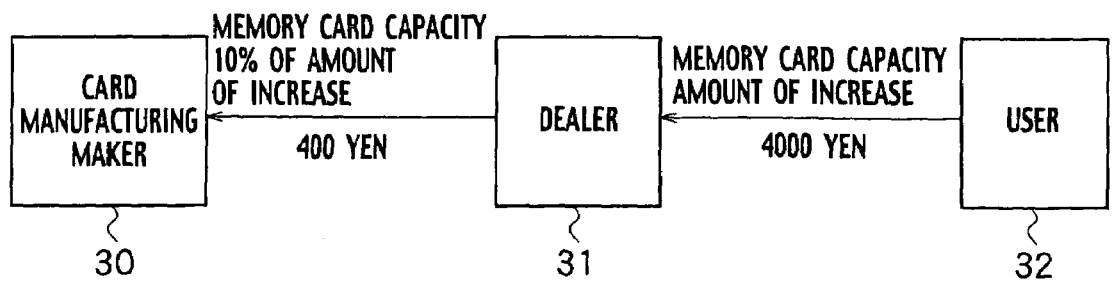
FIG. 12 is a schematic view when the memory capacity is increased in the memory capacity charge giving/receiving method according to the first embodiment.

(a) First, in step S401 of FIG. 11, the aforementioned increase of the usable capacity of the memory card is carried out by using the host device 101. Then, in step S402, a user 32 deposits money through the money deposit/withdrawal port 103 of the host device 101 to pay a charge. For example, if the user 32 increases the memory card to 128 MB, he pays 4000 yen to the host device 101 (see FIG. 6).

(b) In step S403, the dealer 31 collects the charge, of 4000 yen.

(c) Then, in step S404, the dealer 31 feeds back a fixed amount of the collected charge to a card manufacturer 30. For example, if 10% of the collected charge is fed back, the dealer 31 feeds back 400 yen to the memory card manufacturer 31. Accordingly, the dealer 31 makes a profit of 3600 yen, and the card manufacturer 30 makes a profit of 400 yen. Thus, when the user 32 increases the memory capacity, profits are increased not only for the dealer 31 but also for the card manufacturer 30.

(d) Subsequently, in step S405, the memory card manufacturer 30 reduces the amount of money payable when it delivers the memory card to the dealer 31 in accordance with the fed back amount of money. Thus, the reduced amount of money payable for the memory cards delivered to the dealer 31 increases the profit of the dealer 31.

Note that in this case, the memory capacity management server 100 is managed by the card manufacturer 30. Thus, since the amount of money for the increase is known by the card manufacturer 30, it is possible to prevent illegal operations such as no feeding-back from the profited dealer 31 to the card manufacturer 30.

Next, a flow of a charge when the memory capacity is reduced will be described referring to FIGS. 13 and 14.

Figure 13:
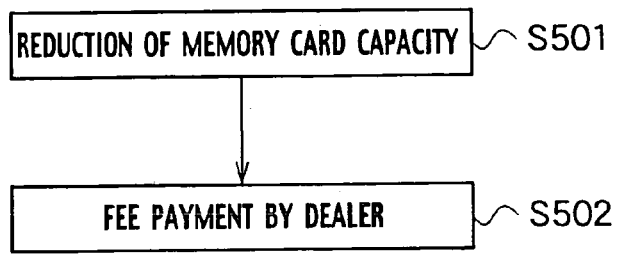
FIG. 13 is a flowchart when the memory capacity is reduced in the memory capacity charge giving/receiving method according to the first embodiment.

(a) First, in step S501 of FIG. 13, the aforementioned reduction of the memory card is carried out by using the host device 101.

(b) Then, in step S502, the user 32 receives money refunded from the money deposit/withdrawal port 103 of the host device 101. For example, if the user 32 reduces the memory card by 128 MB, the host device 101 pays out 2000 yen (see FIG. 8). As shown in FIG. 14, the amount of money for the reduction is paid from the dealer 31 to the user 32, while no payment is made from the card manufacturer 30 to the dealer 31.

As shown in FIGS. 6 and 8, according to the memory capacity changing system of the first embodiment, the amount of money corresponding to a reduction per unit of memory capacity is set lower than that corresponding to an increase. Specifically, the amount of money corresponding to the reduction per unit of memory capacity may be set equal to or lower than a half of the amount of money corresponding to the increase. Accordingly, even if one user increases the capacity by 128 MB and one user reduces the capacity by 128 MB, the dealer 31 makes a profit of 4000 yen (usable capacity increase)−400 yen (paid to the card manufacturer)−2000 yen (usable capacity reduction)=1600 yen. Thus, even if no money for the reduction is paid from the card manufacturer 30 to the dealer 31, the dealer 31 can still make a profit from the increase.

Moreover, as a company which uses the memory capacity changing system of the first embodiment, a memory card manufacturer, a host device manufacturer, a memory card OEM manufacturer, or the like can be cited. Furthermore, as the dealer 31, a memory card store, a convenience store, a railway company, a bookstore or the like can be cited. The host device 101 may be installed at the store of the dealer 31. Alternatively, it may be installed at the other place, and money may be collected by the dealer 31.

(Example of Using Memory Capacity Changing System)

Next, description will be made of a case of using the memory capacity changing system according to the first embodiment.

A memory card is necessary for using a digital still camera (DSC), and a DSC manufacturer sells products which come with memory cards of minimum capacities in order to reduce costs. As the memory card manufacturer tends not to manufacture a memory card of small capacities, capacities of memory cards supplied in the products inevitably become large, creating a problem of high product costs.

If the DSC manufacturer uses the memory capacity changing system of the first embodiment, a memory card having only a minimum usable capacity is supplied in a product. If the user requires an increased capacity, a user who has bought the DSC pays a charge. Thus, the DSC manufacturer can limit costs to a fixed level.

It is now assumed that the memory card according to the first embodiment is attached to a magazine or the like. The memory card stores supplement data of a magazine, and other parts can be made usable when the user pays a charge for an increase. Thus, disposing of memory cards is reduced, whereby a system friendly to the environment can be provided.

Second Embodiment

According to the first embodiment, the usable capacity of one memory card 102 is changed. According to a second embodiment, however, by transferring a right of using a usable capacity of a memory card 102 (capacity of a user data area 112) to the other card, a usable capacity of one memory card 102 is changed to a plurality of memory cards 102, or usable capacities of a plurality of memory cards 102 are changed to one memory card 102. Alternatively, the usable capacities of the plurality of memory cards 102 may be changed to a plurality of memory cards 102. According to the first embodiment, the unusable area 120 is set in the user data area 112, and the area is changed to change the usable capacity. According to the second embodiment, however, the usable capacity (capacity of the user data area 112) is changed by changing a capacity of a security area 11. Note that the second embodiment will be described by exemplifying an SD memory card as a memory card, similarly to the case of the first embodiment.

The transmission module 12 of the host device 101 of the first embodiment changes the capacities of the user data area 112 and the unusable area 120 by transmitting the user data area changing command as the area changing command. A transmission module 12 of the host device 101 according to the second embodiment uses a security area changing command (CHANGE-SECURE-AREA COMMAND) realized by the SD memory card to change the capacity of the security area 112, whereby the capacity of the user data area 112 is changed virtually.

Other components of the memory capacity changing system, the host device and the memory card of the second embodiment are similar to those of FIGS. 1 and 2. Thus, description thereof will be omitted.

Next, description will be made of a memory capacity changing method according to the second embodiment referring to FIGS. 15 to 19.

Figure 15:
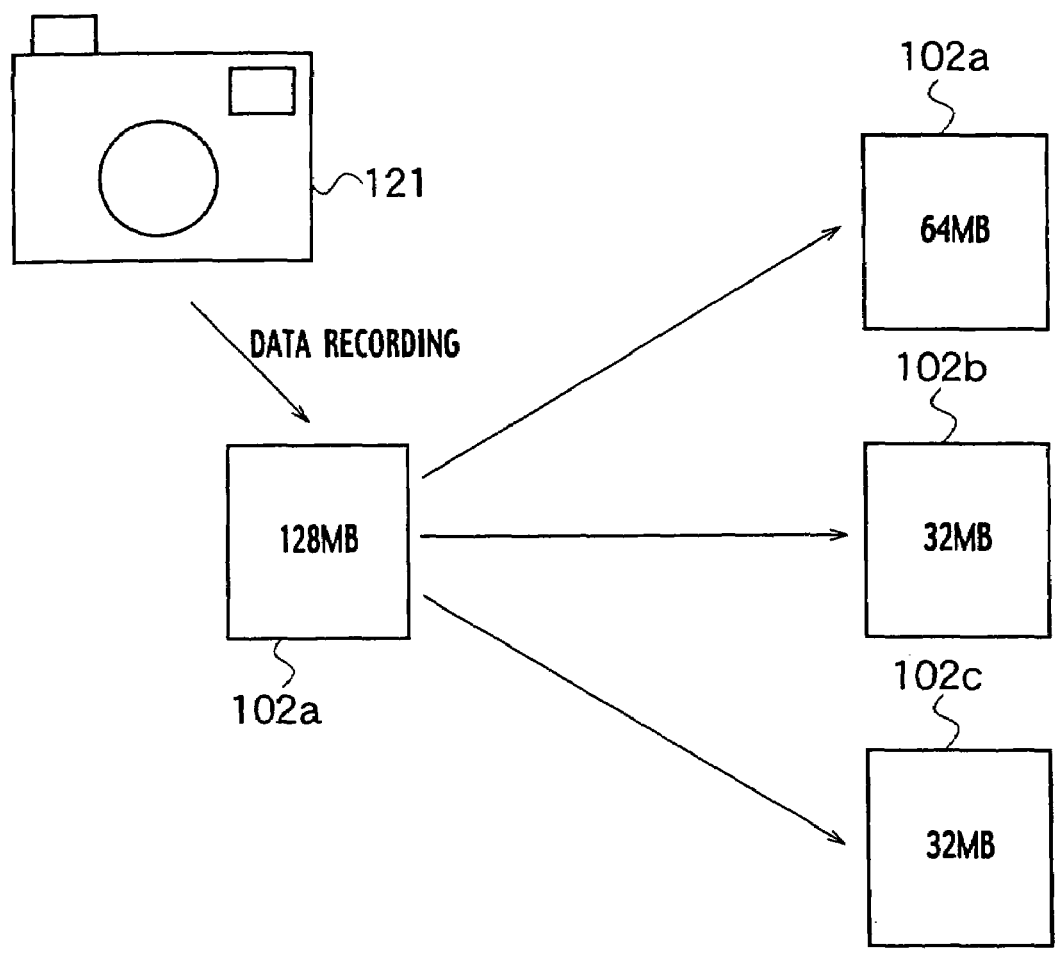
FIG. 15 is a schematic view explaining a memory capacity changing method according to a second embodiment.

As shown in FIG. 15, a user α has a memory card A102a with a total capacity of 512 MB and a usable capacity of 128 MB, and a digital still camera 121. For example, the user a saves an image of 30 MB in the memory card A102a photographed by the digital still camera 121 while traveling. The user a decides to send this data to two friends, users β and γ.

At this time, only 30 MB is actually used while the memory card A102a of the user α has a capacity of 128 MB. Accordingly, the user α decides to divide and transfer a usable capacity 64 MB of the memory card A102a to two memory cards. Then, the user α buys two memory cards at a memory card store, a memory card B102b and a memory card C102c. Usable capacities (capacities of user data areas) of the cards having total memory capacities of 512 MB are 0 MB. In this case, memory capacities of the memory card A102a, the memory card B102b and the memory card C102c are as shown in FIGS. 16A and 16B. That is, a security area 111a of the memory card A102a is 382 MB, and a user data area 112a which is a usable area is 128 MB; security areas 111b, 111c of the memory card B102b and the memory card C102c are 510 MB, and user data areas 112b and 112c which are usable areas are 0 MB.

Figure 17:
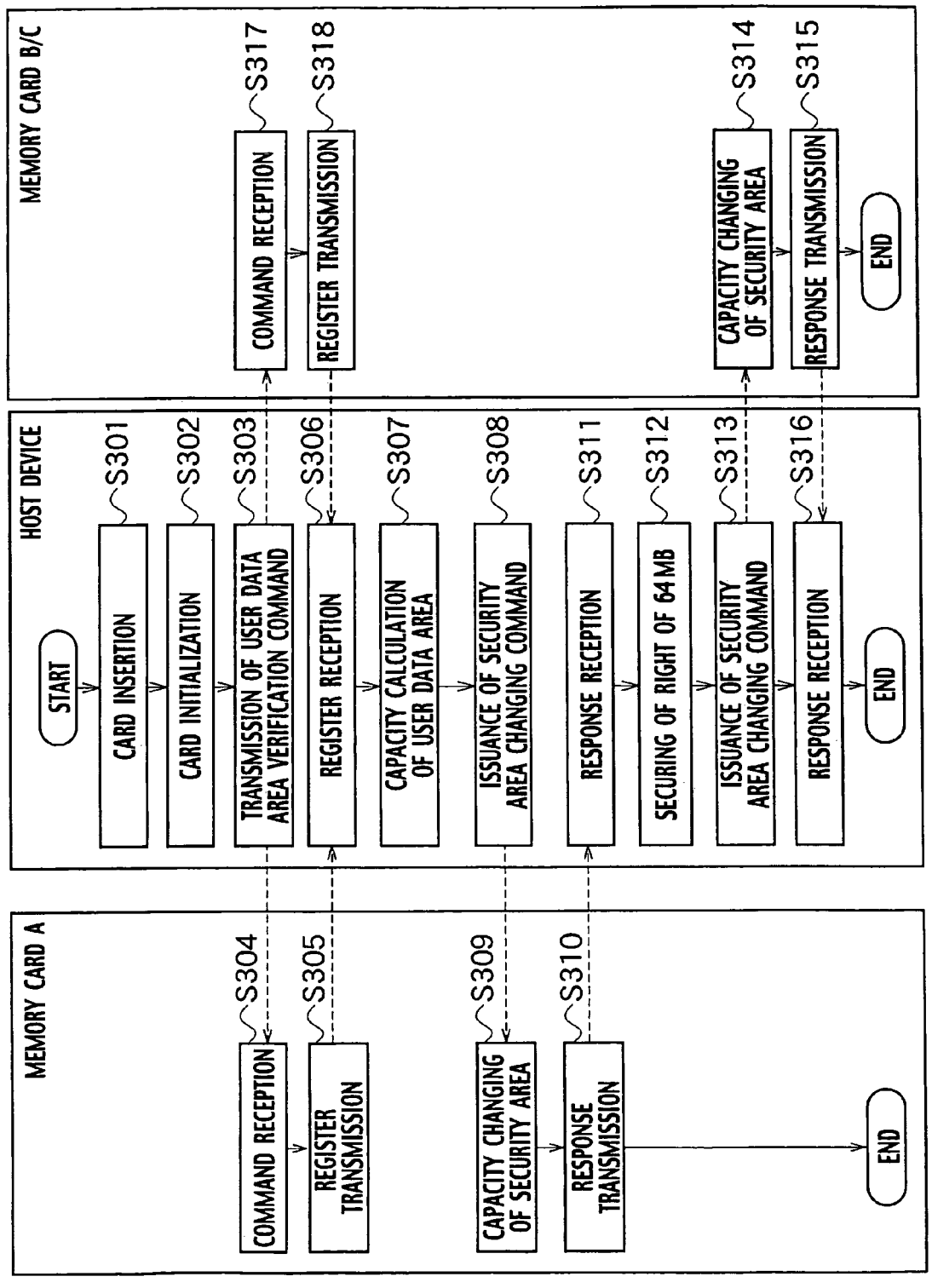
FIG. 17 is a flowchart of the memory capacity changing method according to the second embodiment.

(a) First, the user α visits a store in which the host device 101 is installed, and inserts the memory card A102a, whose usable capacity is transferred, and the memory cards B102b and C102c, to which the usable capacity is transferred, into a memory card insertion port 104 of the host device 101 in step S301 of FIG. 17. Then, in step S302, the host device 101 carries out initialization processing to set the memory cards A102a, B102b and C102c to readable/writable states.

(b) Then, in step S303, the host device 101 transmits a command to read out a register which stores a value for calculating the capacity of the user data area 112 to the memory card A102a. Similarly, the host device 101 transmits commands to read out registers to the memory card B102b and the memory card C102c. The memory card A102a receives the command in step S304, and transmits a register value stored in a management data area 110 to the host device 101 in step S305. Similarly, the memory cards B102b and C102c receive the commands in step S317, and transmit register values stored in management data areas 110 to the host device 101 in step S318.

Figure 18:
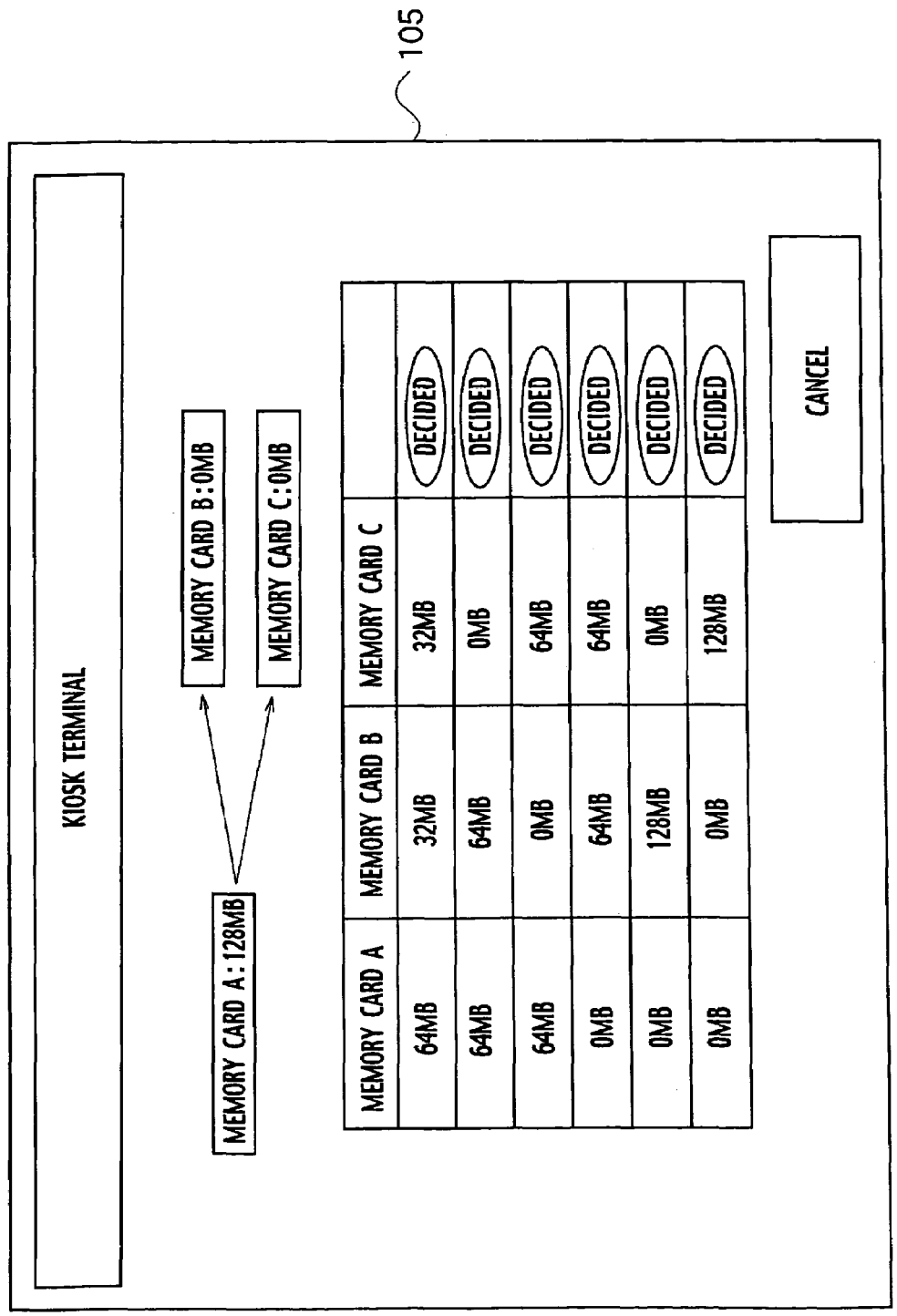
FIG. 18 is a view showing an operation screen example of a host device according to the second embodiment.

(c) Next, in step S306, the host device 101 receives the register values from the memory cards A102a, B102b and C102c. Then, in step S307, the host device 101 calculates total memory capacities (maximum capacities) of the memory cards A102a, B102b and C102c and current capacities of the user data areas 112. Then, as shown in FIG. 18, the host device 101 causes a combination of the current capacity of the user data area 112 and a transferable memory capacity to be displayed on an LCD panel 105. The user selects a desired combination of memory capacity transfer. It is assumed here that the user selects a combination (memory card A102a: 64 MB, memory card B102b: 32 MB, memory card C102c: 32 MB) of dividing the usable capacity of the memory card A102a of 128 MB to the memory cards B102b and C102c by 32 MB respectively, and depresses a "DECIDE" button.

(d) Subsequently, in step S308, the host device 101 transmits a security area changing command to the memory card A102a in order to change the capacity of the user data area 112a of the memory card A102a. In step S309, the memory card A102a receives the security area changing command to change the capacity of the security area 111a. Specifically, a controller 116 of the memory card A102a changes a capacity value of the security area 111a stored in the management data area 110a or in a hidden area to change the security area 111a from 382 MB shown in FIG. 16A to 446 MB shown in FIG. 16B. Accordingly, the user data area 112a is reduced from 128 MB to 64 MB. Then, in step S310, the memory card A102a transmits a response to the host device 101.

(e) Next, in step S311, the host device 101 receives a response from the memory card A102a, and temporarily saves a right to the amount of user data area 112 to the reduced from the memory card A102a in step S312. Specifically, the reduced usable capacity is saved in a capacity information storage unit 20.

(f) Then, in step S313, the host device 101 transmits a security area changing command to the memory card B102b in order to change the capacity of the user data area 112b of the memory card B102b. In step S314, the memory card B102b receives the security area changing command to change the capacity of the security area 111a. Specifically, a controller 116 of the memory card B102b changes a capacity value of the security area 111a stored in the management data area 110a or in a hidden area to change the security area 11a from 510 MB shown in FIG. 16A to 478 MB shown in FIG. 16B. Accordingly, the user data area 112b is increased from 0 MB to 32 MB. Then, in step S315, the memory card B102b transmits a response to the host device 101. The processing of steps S313 to S316 is also performed for the memory card C102c. Thus, the reduced user data area 112a of the memory card A102a is transferred to the memory cards B102b and C102c.

Through such a process, the user α can copy the data of 30 MB of the memory card A102a to the memory cards B102b and C102c to send the cards to the users β and γ.

According to the memory capacity changing method, the user a can distribute the unused area to other memory cards, and a useless area unused in the memory card of 128 MB can be effectively used.

Next, a description will be made of a case of combining capacities of a plurality of memory cards to one memory card referring to FIGS. 19A and 19B.

For example, it is assumed that the user α wants to save 100 MB of data. However, data areas 112 of four memory cards of the user, 102d, 102e, 102f and 102g, are all 32 MB.

In this event, the user α purchases one memory card 102h having a user area of 0 MB in a total memory capacity of 512 MB, and visits a store in which the host device 101 is installed. Then, the user a inserts the memory cards 102d to 102 g of 32 MB and the memory card 102h into the host device 101.

Next, the host device 101 carries out initialization processing for the 32 MB memory cards 102d to 102g and the memory card 102h to calculate a capacity of the user data area 112.

Then, as shown in FIG. 19B, the user a transfers a right to a total memory capacity of the 32 MB memory cards 102d to 102g to the memory card 102h.

Subsequently, in order to transfer rights to the user data areas of the 32 MB memory cards 102d to 102g to the memory card 102h, the host device 101 changes the capacities of the user data areas 112 of the 32 MB memory cards 102d to 102g. Specifically, the controller 116 of the memory cards 102d to 102g changes capacity values of security areas 111d, 111e, 111f and 111g stored in management data areas 110d, 110e, 110f and 110g or in hidden areas to change the security areas 111d, 111e, 111f and 111g from 478 MB shown in FIG. 19A to 510 MB shown in FIG. 16B. Thus, user data areas 112d, 112e, 112f and 112g are reduced from 32 MB to 0 MB.

At this point of time, the host device 101 temporarily saves the right to 128 MB from the user data areas of the four 32 MB memory cards.

Then, in order to add the rights secured from the four 32 MB memory cards to the user data area 112 of the memory card 102h, the host device 101 changes the capacity of the user data area 112 of the memory card 102h. Specifically, the controller 116 of the memory card 102h changes a capacity value of a security area 111h stored in a management data area 110h or in the hidden area to change the security area 111h from 510 MB shown in FIG. 19A to 382 MB shown in FIG. 16B. Thus, a user data area 112h is increased from 0 MB to 128 MB.

According to the memory capacity changing method of the second embodiment, since the right to the capacity of one large-capacity memory card 102a can be divided among a plurality of memory cards 102b and 102c, or the rights to the capacity of a plurality of small-capacity memory cards 102d to 102g can be combined in to one memory card 102h to be used, the memory card can be effectively used.

Moreover, the dealer may collect the memory card 102 whose capacity right has been transferred, making the memory capacity "0 MB" and will not be used any more. Such collection enables reuse of the memory card 102.

Other Embodiments

The first and second embodiments of the present invention have been described. However, it should be understood that the descriptions and the drawings which are parts of the disclosure are in no way limitative of the invention. As apparent to those skilled in the art, various alternative embodiments, examples and operation technologies are possible.

For example, a KIOSK terminal is exemplified in FIG. 1 as the host device 101. However, the host device 101 is not limited to the KIOSK terminal as long as it has functions shown in FIG. 2. For example, a personal computer, a portable telephone or the like on which a memory card interface is mounted can be used. In this case, the personal computer or the portable telephone needs an application dedicated to user data area change.

In the embodiments, the total memory capacity of the memory card is set to 512 MB. However, the total memory capacity is not particularly limited to this value, and can be freely set by the card manufacturer.

The usable capacity changing methods are realized by changing the capacities of the user data area and the unusable area in the first embodiment, and by changing the capacity of the security area in the second embodiment. However, either of the methods can be used.

Figure 7:
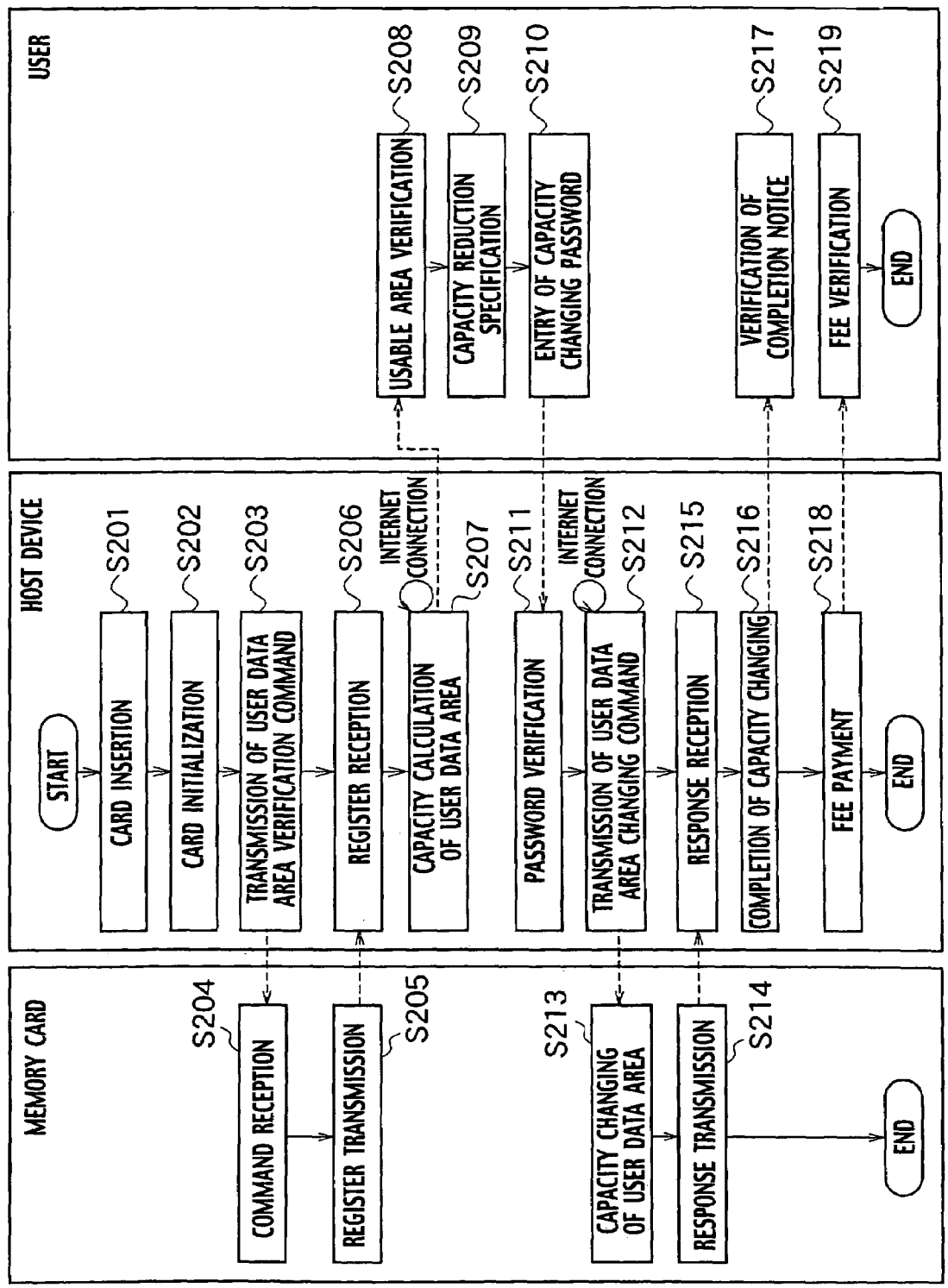
FIG. 7 is a flowchart when the memory capacity is reduced in the memory capacity changing method according to the first embodiment.

In step S107 of FIG. 3 and in step S207 of FIG. 7, the host device 101 accesses the memory card capacity management server 100 to acquire data on the amount of money corresponding to an increase or a reduction of the memory capacity. However, the timing of acquiring the money amount data is not limited to this. For example, in FIG. 5, data on the amount of money corresponding to an increase may be acquired when the user depresses the "MEMORY INCREASE" button, and data on the amount of data corresponding to a reduction may be acquired when the user depresses the "MEMORY REDUCTION" button. Alternatively, without accessing to the memory card capacity management server 100, the money amount data may be saved beforehand in the host device 101.

Similarly, in step S110 of FIG. 3 and in step S210 of FIG. 7, the user inputs the capacity changing password. However, the timing of inputting the password is not limited to this. For example, the password may be entered when the memory card 102 is inserted into the host device 101. Moreover, in the memory capacity changing method of the second embodiment (see FIG. 16), needless to say, a step of inputting a password may be set up.

Furthermore, in FIG. 3, after the user deposits the amount of money for increasing the capacity (step S114), the memory capacity is increased (step S116). However, the order may be reversed. Similarly, in FIG. 7, after the memory capacity is reduced (step S213), the amount of money for the reduction is refunded to the user (step S218). However, this order may be reversed.

In the second embodiment, a new card is purchased, and the right of use is transferred. However, needless to say, the right of use may be transferred to an already-owned memory card.

Various modifications will become possible for those skilled in the art after receiving the teachings of the disclosure without departing from the scope thereof.

What is claimed is:

1. A system for exchanging information with a memory card, the system comprising:
   The memory card including
      a usable area for saving user data, and
      a security area for storing secret data, the memory card changing the capacity of the usable area by changing the capacity of the security area, the system being accessible with the security area only when the system is authenticated according to executing two-way authentication with the memory card;
   a central processing unit including
      a charge management module configured to receive payment of a charge corresponding to an increased amount of a usable area when a capacity of the usable area of the memory card for saving user data is increased, and pay out a charge corresponding to the reduced amount of the usable area when the capacity of the usable area is reduced; and
      a transmission module configured to transmit an area changing command to instruct an increase or a reduction of the usable area in accordance with the charge to the memory card.

2. The system of claim 1, wherein the central processing unit further includes a capacity calculation module configured to calculate the capacity of the usable area of the memory card.

3. The system of claim 1, wherein the area changing command changes the capacity of the usable area of the memory card, and a capacity of an unusable area set in the usable area.

4. The system of claim 1, wherein the area changing command changes a capacity of a security area of the memory card to be accessed only when the system of the memory card is authenticated.

5. The system of claim 1, wherein the central processing unit further includes a connection module configured to notify a change of the capacity of the usable area to a memory capacity management server which manages a current capacity of the usable area of the memory card through a communication network.

6. A memory card comprising:
   a usable area for saving a user data; and
   a security area for storing secret data and configured to execute two-way authentication with a connected system, and to be accessible only when the connected system is authenticated;
   a controller for changing a capacity of the usable area by changing the capacity of the security area, in accordance with an area changing command to instruct an increase or a reduction of the usable area based on a charge, the command being transmitted from a system which receives payment of a charge corresponding to an increased amount of the usable area if the usable area is increased, and pays out a charge corresponding to a reduction of the usable area if the usable area is reduced.

7. The memory card of claim 6, further comprising:
   an unusable area set in the usable area,
   wherein the controller changes the capacity of the usable area and a capacity of the unusable area in accordance with the area changing command.

8. The memory card of claim 7, wherein the controller temporarily saves the user data in a part of the unusable area.

9. The memory card of claim 6, further comprising:
   a security area to be accessed only when two-way authentication with the system is carried out and the system is authenticated,
   wherein the controller changes a capacity of the security area in accordance with the area changing command.

10. The memory card of claim 6, wherein the card is 24×32×2.1 mm in size and has a copyright protection function compliant with an SDMI standard.

* * * * *